(12) United States Patent
Thakkar

(10) Patent No.: US 11,966,274 B2
(45) Date of Patent: Apr. 23, 2024

(54) DATACENTER CARBON FOOTPRINT CLIMATE IMPACT REDUCTION

(71) Applicant: Dell Products L.P., Round Rock, TX (US)

(72) Inventor: Bina Thakkar, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/585,524

(22) Filed: Jan. 26, 2022

(65) Prior Publication Data

US 2023/0236656 A1 Jul. 27, 2023

(51) Int. Cl.
| | | |
|---|---|---|
| *G06F 1/3296* | (2019.01) | |
| *G06F 1/3209* | (2019.01) | |
| *G06N 3/126* | (2023.01) | |

(52) U.S. Cl.
CPC .......... *G06F 1/3296* (2013.01); *G06F 1/3209* (2013.01); *G06N 3/126* (2013.01)

(58) Field of Classification Search
CPC ...... G06F 1/3296; G06F 1/3209; G06N 3/126
See application file for complete search history.

(56) References Cited

U.S. PATENT DOCUMENTS

| | | | |
|---|---|---|---|
| 2010/0191998 A1 | 7/2010 | Moore | |
| 2010/0235654 A1* | 9/2010 | Malik ................... | G06F 1/3203 713/300 |
| 2011/0161968 A1 | 6/2011 | Bash et al. | |
| 2015/0241947 A1* | 8/2015 | Allen-Ware .......... | G06F 1/3296 713/320 |
| 2018/0268981 A1* | 9/2018 | Chen ....................... | H01F 27/33 |
| 2021/0342185 A1 | 11/2021 | Naidu et al. | |
| 2023/0017632 A1 | 1/2023 | Herb et al. | |

FOREIGN PATENT DOCUMENTS

CN 111126707 A * 5/2020 ............. G06N 3/126

OTHER PUBLICATIONS

Genetic Algorithms, https://www.geeksforgeeks.org/genetic-algorithms/, 2022, 15 pgs.
Non-Final Office Action received for U.S. Appl. No. 17/585,521, dated Sep. 14, 2023, 42 pages.
Notice of Allowance for U.S. Appl. No. 17/585,521 dated Jan. 10, 2024.

* cited by examiner

*Primary Examiner* — Jaweed A Abbaszadeh
*Assistant Examiner* — Brian J Corcoran
(74) *Attorney, Agent, or Firm* — Amin, Turocy & Watson, LLP

(57) ABSTRACT

The technology described herein is directed towards optimizing power consumption of devices, e.g., in a datacenter. A modified (two-tier) genetic algorithm performs a carbon footprint-based optimization in a first tier to determine a candidate range of coefficients for each device type, e.g., servers, switches and storage devices/systems that likely reduce carbon footprint of each device type. In a second tier of the genetic algorithm, those ranges of coefficients are used in conjunction with actual power usage-based carbon footprint scores of individual devices to find respective sets of coefficients that minimize respective objective functions for the servers, the switches and the storage devices. The sets of coefficients can be used for power capping the devices. Device performance constraint-based intelligent selection can be used in one or both tiers to speed up convergence.

20 Claims, 10 Drawing Sheets

DATACENTER CARBON FOOTPRINT CLIMATE IMPACT REDUCTION

BACKGROUND

At present, datacenters use on the order of one to two percent of the world's electricity, and contribute to approximately two percent of the world's carbon dioxide emissions. These percentages continue to increase over time. For some systems, over eighty-five percent of those systems' carbon footprints are due to power consumed during product utilization.

In general, users (e.g., device and service customers) want to reduce their datacenters' carbon footprints across servers, network devices and storage systems. The conflicting goals of accomplishing high performance along with low carbon impact present a challenge for a datacenter to have reduced power consumption and a reduced carbon footprint given the performance constraints of retaining high bandwidth and high input-output operations per second (IOPS).

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards optimizing power consumption of devices, e.g., in a datacenter. In one implementation, a modified (two-tier) genetic algorithm obtains, in a first tier, performs a carbon footprint-based optimization to determine a range of coefficients for each device type, e.g., servers, switches and storage devices/systems. Constraint-based intelligent selection can be used to speed up convergence.

In a second tier of the genetic algorithm, those ranges of coefficients are used in conjunction with actual power usage-based carbon footprint scores of individual devices to find respective sets of coefficients that minimize respective objective functions for servers, switches and storage devices. Constraint-based intelligent selection again can be used to speed up convergence. The sets of coefficients can be used for power capping the devices.

It should be understood that any of the examples herein are non-limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
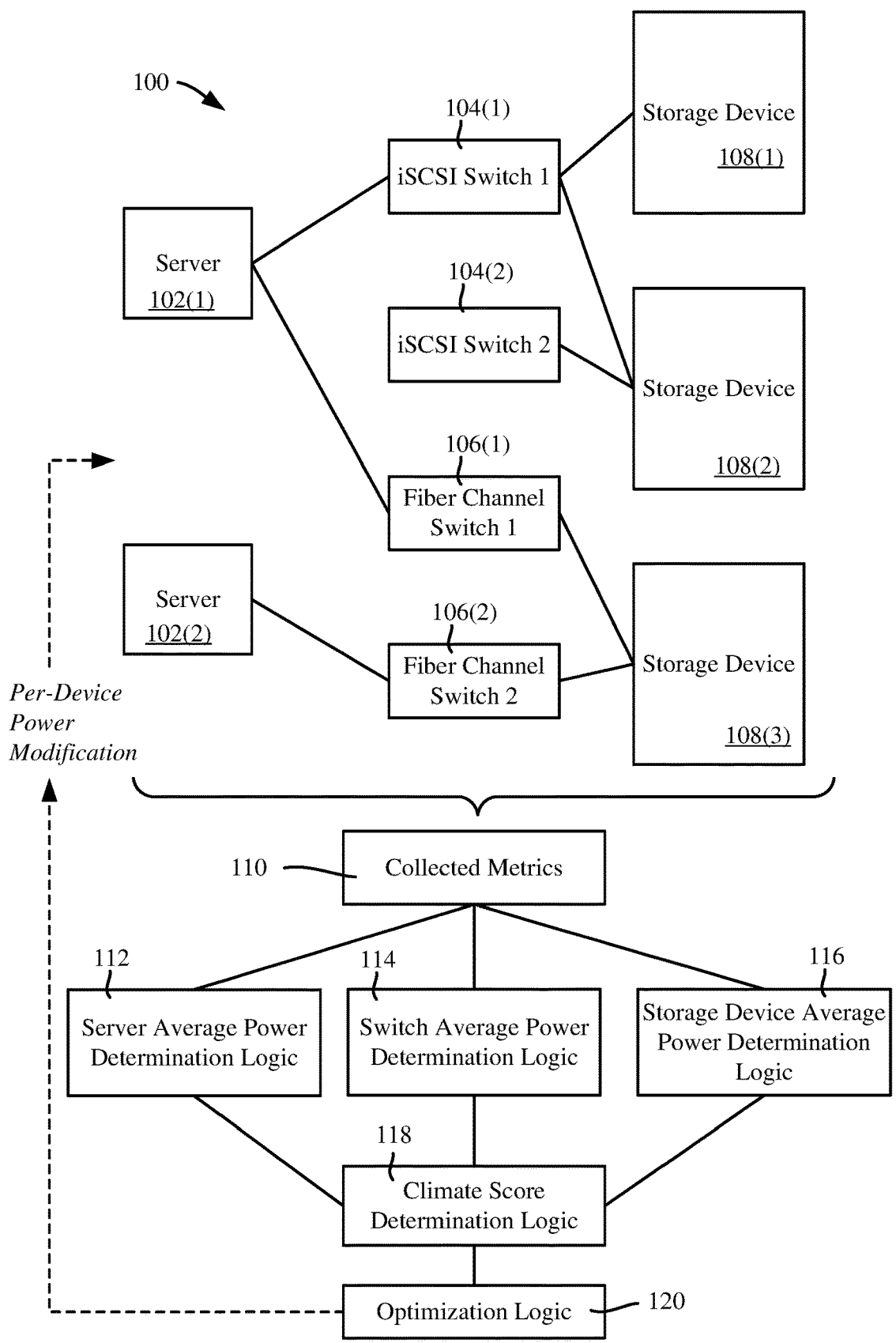
FIG. 1 is a block diagram representation of example components from which a climate score can be determined for devices for use in reducing carbon footprints of devices, in accordance with various aspects and implementations of the subject disclosure.

FIG. 1 shows a datacenter 100 or the like that includes server devices 102(1) and 102(2), network (e.g., Internet Small Computer Systems Interface (iSCSI) switch) devices 104(1) and 104(2), network (e.g., fiber (sometimes spelled fibre) channel switch) devices 106(1) and 106(2) and storage devices 108(1) and 108(2). Based on the type of device, various metrics 110 are collected that relate to power consumption of a device. For example for the storage devices 108(1) and 108(2), collected per-device metrics can include input-output operations per second (IOPS), bandwidth, and percentage reads and writes. For the network devices 104(1), 104(2), 106(1) and 106(2), collected per-device metrics can similarly include input-output operations per second (IOPS), bandwidth, and read and write percentages, as well as the number of connections. Power consumed while idle can also be obtained. For the server devices 102(1) and 102(2), collected per-device metrics can include central processing unit (CPU) utilization data, maximum power data, idle power data, memory utilization data, and input-output utilization data, e.g., for a local storage device.

Based on the collected metrics 110, server average power determination logic 112, switch average power determination logic 114 and storage device average power determination logic 116 compute power usage as described herein. Based on the power usage data, climate score determination logic 118 determines climate impact carbon footprint climate impact scores for the devices. Then, based on the climate impact carbon footprint climate impact scores, optimization logic 120 as described herein can modify the various devices' power consumption, to reduce the climate impact of each device, and thus the overall climate impact of the datacenter 100.

For a storage device, the storage device average power determination logic 116 computes the following average power (Pavg) consumption values; note that reads (Pread) and writes (Pwrite) consume different amounts of power:

$$P\text{avg for storage device}=(P\text{write}*\%\text{ write}+P\text{read}*\%\text{ read})/\text{bandwidth for workload},$$

and calculates the average power for the system as:

$$P\text{avg for system}=(\text{Sum for workloads }p\_WL\_\text{avg}+P\text{idle})/100.$$

Note that storage devices of a type having similar IOSize and/or read write percentage ranges can be clustered together into a workload, and the above computations can be per workload instead of or in addition to per storage device.

For a network device (e.g., switch), power usage for each workload depends on similar metrics to storage devices but also on the number of connections. The metrics collected are thus IOPS (reads and writes and percentages) and bandwidth, and the number of connections for each workload is obtained. The network device average power determination logic 114 calculates the average power and power/bandwidth for each network device cluster as:

$$P\text{avg for Network Device}=(P\text{write}*\%\text{ write}+P\text{read}*\%\text{ read})/\text{bandwidth for Workload}+P\text{connections}*\text{number of network device connections},$$

and calculates the average power for the system as:

$$P\text{avg for system}=(\text{Sum for all devices of a type }p\_WL\_\text{avg}+P\text{idle})/100.$$

Note that network devices of a type having similar IOSize and/or read write percentage ranges can be clustered together into a workload, and the above computations can be per workload instead of or in addition to per network device.

For the servers, based on data center topology, the server(s) connected to the switch are identified, and the server average power determination logic 112 calculates the power usage for a server workload (WL) based on CPU utilization, memory utilization and IO utilization as:

$$P\_\text{CPU}\_\text{UTIL}\_WL\_\text{avg for server CPU}=(P\text{max}-P\text{idle})\text{cpuUtilization}/100+P\text{idle};$$

for example a typical hourly power calculation based the CPU utilization can be (500−250)*75/100+200=250 watts; converted to a daily value of =250*24=6000 w=6 kw (hours) and Yearly=6*365=2190 kwh.

Memory utilization data is further used, as is TO utilization:

$$P\_\text{MEMORY}\_\text{UTIL}\_WL\_\text{avg}=(P\text{max}-P\text{idle})\text{memoryUtilization}/100+P\text{idle}$$

$$P\_\text{IO}\_\text{UTIL}\_WL\_\text{avg for server IO}=(P\text{max}-P\text{idle})\text{ioUtilization}/100+P\text{idle}.$$

For a system, the average server power usage is:

$$P\text{avg for system}=(\text{Sum for all servers }p\_WL\_\text{avg}+P\text{idle})/100.$$

With the power usage results from calculating the power usage per device (and/or workload), a carbon footprint value can be calculated per workload based on location of the datacenter. Note that existing per-location APIs and the like can be leveraged for this, e.g., in the US, a zip code can provide the location data, whereby it is straightforward to convert power usage data to a carbon footprint climate impact score.

Such scores, for example, can be normalized across multiple workloads as well as datacenters, e.g., zero to one-hundred, with zero representing no climate impact/there is a green solution, and higher numbers representing a higher climate impact:

$$\text{Climate Impact Score}=((x-x\text{min})/(x\text{max}-x\text{min}))*100.$$

Figure 2:
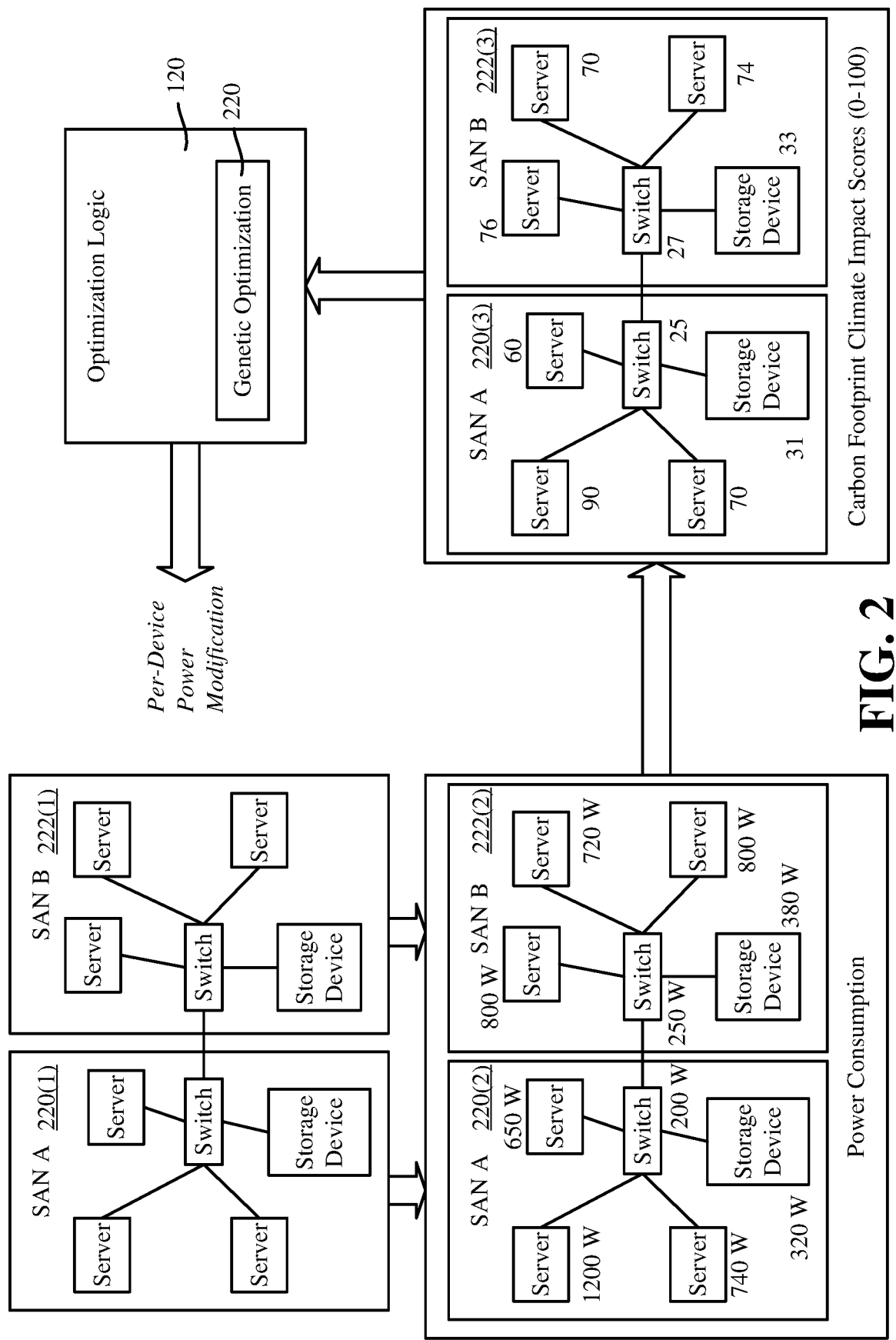
FIG. 2 is an example block diagram representation of determining carbon footprint climate impact scores based on power consumption of devices, which can be used to reduce carbon footprint, in accordance with various aspects and implementations of the subject disclosure.

FIG. 2 shows an example of a datacenter with two storage area networks (SAN A and SAN B) in a first state (blocks 220(1) and 222(1)) in which the metrics are being collected. As can be seen in the example of FIG. 2, in a second state (blocks 220(2) and 222(2)), the power consumption of each device has been determined as described herein to obtain a per workload power usage value (in Watts, W). In a third state represented by (blocks 220(3) and 222(3)), these power usage values are converted to normalized carbon footprint climate impact scores (0-100). Based on these scores, optimization logic, e.g., based on genetic optimization as described herein, can operate to determine per-device (or per-workload) coefficient values that when applied, perform per-device (or per workload) power modification (e.g., power capping). Note that such optimization can be accomplished without changing devices, or workloads, or moving them.

In general, a datacenter has too many variables to efficiently determine optimization data with a conventional genetic optimization (metaheuristic search) algorithm. Described herein is dividing genetic optimization into two tiers, as well as using intelligent constraint-based selection to more efficiently obtain the optimized coefficient values that when applied, reduce power consumption.

Figure 3:
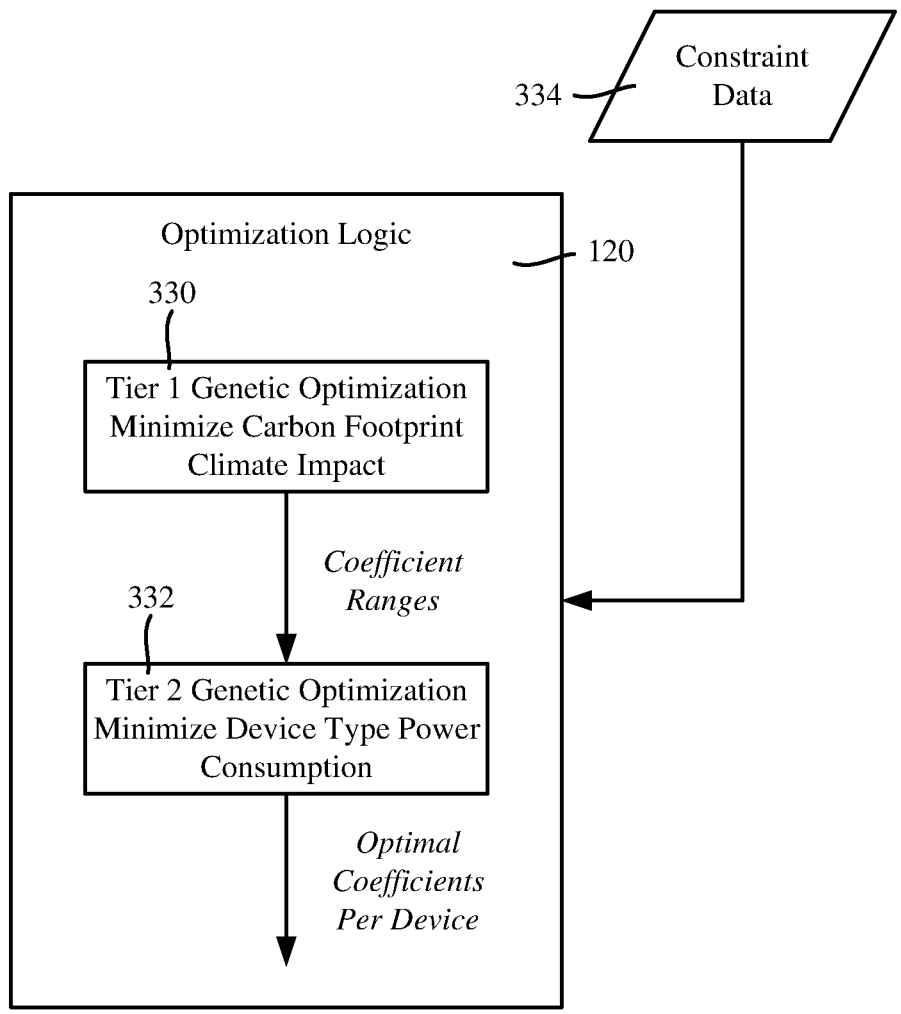
FIG. 3 is an example block diagram representation of optimization logic that can reduce carbon footprint of a datacenter/devices based on two-tiered genetic optimization, in accordance with various aspects and implementations of the subject disclosure.

FIG. 3 shows a general concept of the two tiered genetic optimization, with the first tier 330 operating to find ranges of based on minimizing carbon footprint climate impact scores, that is, the first tier optimizes for all devices, including server, fiber channel switches, iSCSI switches, and storage devices, (which can be storage system groups). The second tier 332 operates, based on the ranges obtained via the first tier, to find coefficients based on minimizing device type power consumption, that is, the second tier optimizes for individual groups containing individual device types; only servers, only fiber channel switches, only iSCSI switches, and storage devices/groups. Note that different types of network devices, including different types of switches, are optimized separately. Constraint data 334, for each type of device, can include device performance requirements comprising power and bits per second (bps) needed to perform adequately, and climate impact score.

Figure 4:
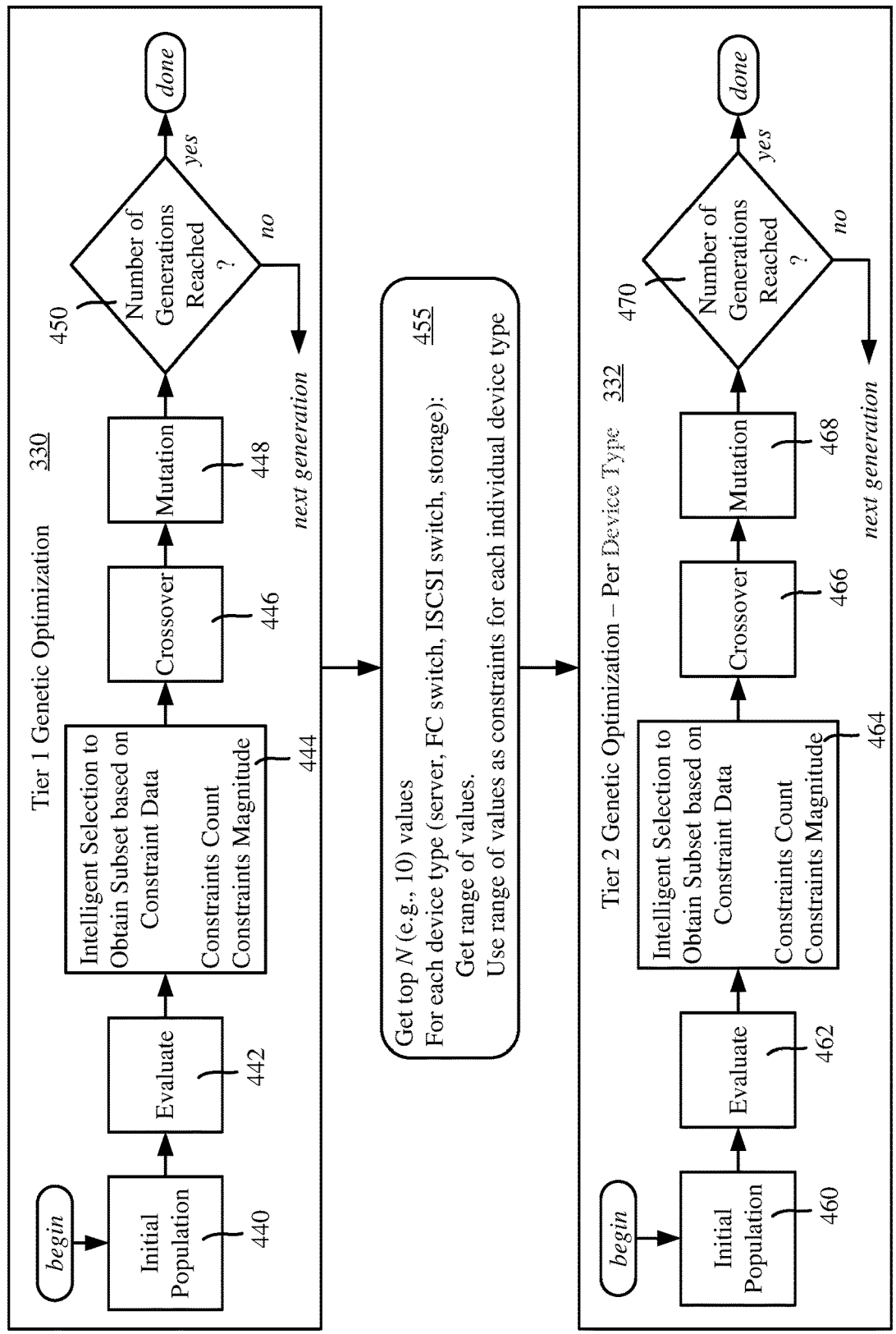
FIG. 4 is an example block diagram representation of details of two-tiered genetic optimization, including optional constraint-based intelligent selection, in accordance with various aspects and implementations of the subject disclosure.

FIG. 4 shows details of the tiers 330 and 332. The tier 1 genetic optimization uses an objective function to minimize the carbon footprint climate impact score. The constraints are device power and device performance requirements. That is, $$y = b1x1 + b2x2 + b3x3 + b4x4$$

where xM (M=1 to 4) represents the average carbon footprint climate impact score (server, switch type 1, switch type 2, storage respectively). The constraints can be summarized as $v1 \leq devicePower \leq v2$ and $bps \leq v3$ Mbps. Given an initial (random) population of coefficients 440, the constraints can be applied to determine a count of missed constraints and magnitude values representing the missed constraints that can occur during optimization. In evaluation (block 442) and intelligent selection (block 444) operations, a subset of the initial population is selected based on descending criteria of less count of missed constraints and less magnitude of missed constraints. Although not required, the use of intelligent selection helps to speed up convergence.

Based on the constraint-selected subset, crossover and mutation operations (blocks 446 and 448) are performed over a number of generations (e.g., operator chosen based on criteria such as practical time limits) to find ranges of the b1 through b4 coefficients for the four device types that minimize the "y" objective function.

The following summarizes tier 1 results in one implementation in which as in FIG. 1, the datacenter 100 has two servers, two fiber channel (FC) Switches, two iSCSI switches and three Storage systems:

$$\text{Objective: } y = b1x1 + b2x2 + b3x3 + b4x4$$

$$y = b1*50 + b2*30 + b3*70 + b4*55$$

x1: server—average carbon footprint climate change impact score (=50)
x2: iSCSI—average carbon footprint climate change impact score (=30)
x3: FC—average carbon footprint climate change impact score (=70)
x4: storage—average carbon footprint climate change impact score (=55) constraints: 200 W$\leq$devicePower$\leq$1500 W, bps$\leq$30000 mbps As summarized via block 455 of FIG. 4, following the first tier, some number N (e.g., 10) of the best coefficient values with respect to minimizing y are selected for each device type (server, FC switch, ISCSI switch, storage). This provides a range of values that can be used in tier 2 processing as constraints for each individual device type. A range is thus obtained from the range of the top N (e.g., top ten) values; for example, from above the server coefficient b1 ranges from 2.5-5.1. Note that different numbers of the best coefficient values can be used for the different device type ranges.

With the per-device coefficient ranges as per-device type constraints, the tier 2 genetic optimization is performed generally similar to tier 1, and thus further details of blocks 460-470 are not repeated herein. Note however that it is feasible to have different tier 1 and tier 2 optimizations.

In general, within the ranges for the device types, tier 2 operates to find an optimized set of coefficients that minimize device type power consumption and thus can be used for power capping devices.

Server $y1 = c1z1 + c2z2 + c3z3 + c4z4 \ldots cizi$ (i=number of servers)
iSCSI Switch $y2 = d1z1 + d2z2 + d3z3 + d4z4 \ldots djzj$ (j=number of iSCSI switches)
FC Switch $y3 = e1z1 + e2z2 + e3z3 + e4z4 \ldots ekzk$ (k=number of FC switches)
Storage Systems $y4 = f1z1 + f2z2 + f3z3 + f4z4 \ldots flzl$ (l=number of storage systems) where zN represents the actual carbon footprint climate impact score for each device (server, iSCSI switch, FC switch, storage device (or group)).

Retaining the same power and bps constraints of tier 1 (constraints: 200 W$\leq$devicePower$\leq$1500 W, bps$\leq$30000 mbps), the following summarizes the server coefficients for the two server devices 102(1) and 102(2) of FIG. 1:

Server $y1 = c1z1 + c2z2 = c1*45 + c2*55$ (where 45 and 55 are the actual per server device carbon footprint climate change impact scores for the two server devices 102(1) and 102(2), respectively). The actual carbon footprint climate change impact scores for the Individual iSCSI switches, FC switches, and storage devices are used to minimize the above corresponding objective functions y2, y3 and y4, respectively.

Figure 5:
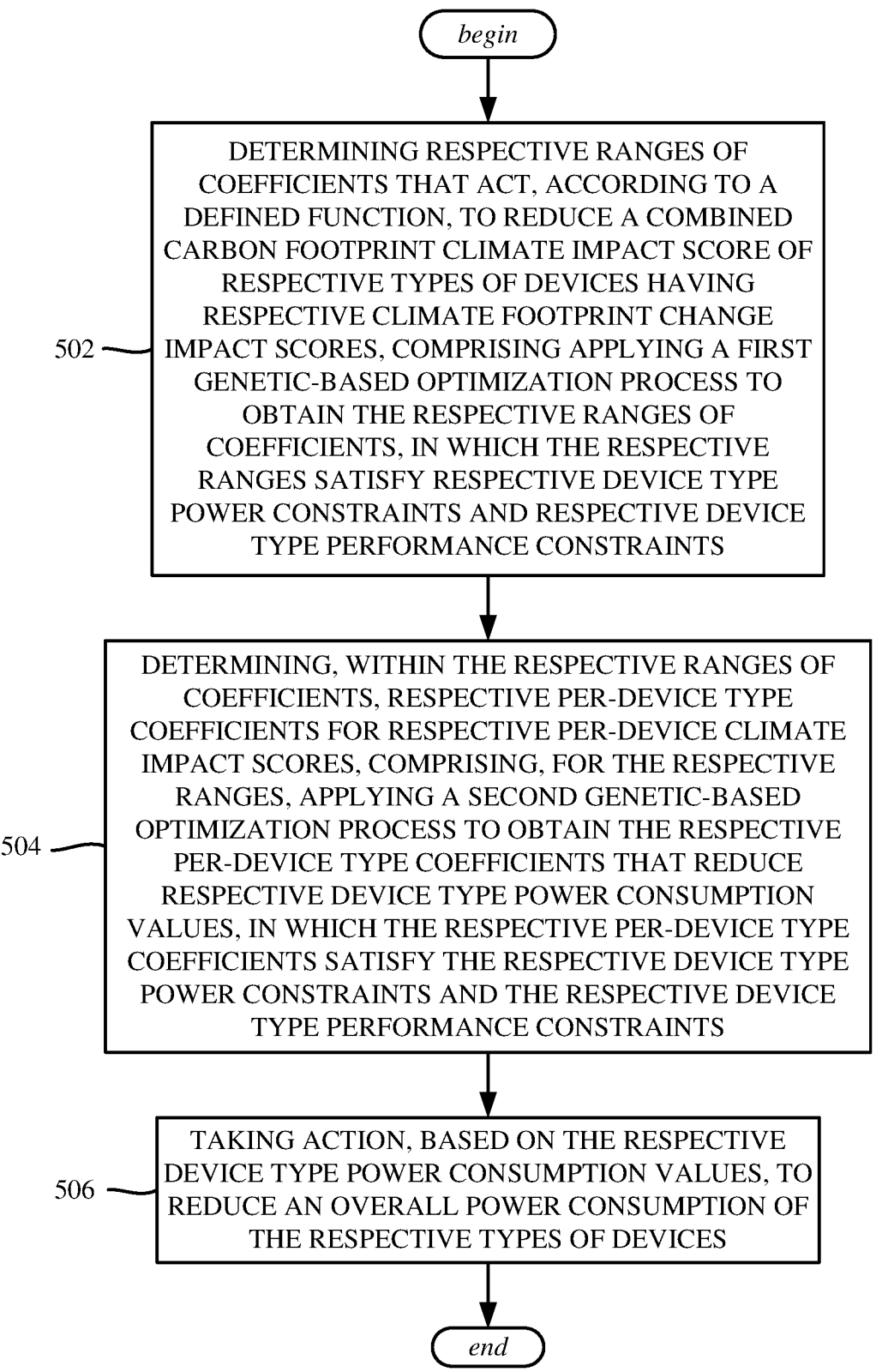
FIG. 5 is a flow diagram showing example operations related to reducing carbon footprint based on reducing power consumption of devices via two-tiered optimization, in accordance with various aspects and implementations of the subject disclosure.

One or more aspects can be embodied in a system, such as represented in FIG. 5, and for example can include a memory that stores computer executable components and/or operations, and a processor that executes computer executable components and/or operations stored in the memory. Example operations can include operation 502, which represents determining respective ranges of coefficients that act, according to a defined function, to reduce a combined carbon footprint climate impact score of respective types of devices having respective climate footprint change impact scores, comprising applying a first genetic-based optimization process to obtain the respective ranges of coefficients, in which the respective ranges satisfy respective device type power constraints and respective device type performance constraints. Operation 504 represents determining, within the respective ranges of coefficients, respective per-device type coefficients for respective per-device climate impact scores, comprising, for the respective ranges, applying a second genetic-based optimization process to obtain the respective per-device type coefficients that reduce respective device type power consumption values, in which the respective per-device type coefficients satisfy the respective device type power constraints and the respective device type performance constraints. Operation 506 represents taking action, based on the respective device type power consumption values, to reduce an overall power consumption of the respective types of devices.

The respective types of devices can include respective server devices, respective switch devices and respective storage devices.

The respective storage devices can include at least one of: fiber channel switches or internet small computer system interface switches.

Determining the respective ranges of coefficients that act, according to the defined function, to reduce the combined carbon footprint climate impact score can include determining the respective ranges of coefficients that act, according to the defined function, to minimize the combined carbon footprint climate impact score.

Further operations can include selecting, from an initial population used in the first genetic-based optimization process, a reduced subset of the initial population based on a count of missed constraints; the reduced subset can be used in crossover and mutation operations of the first genetic-based optimization process.

Further operations can include selecting, from an initial population used in the first genetic-based optimization process, a reduced subset of the initial population based on a magnitude value representative of missed constraints; the reduced subset can be used in crossover and mutation operations of the first genetic-based optimization.

Further operations can include selecting, from an initial population used in the second genetic-based optimization process, a reduced subset of the initial population based on a count of missed constraints; the reduced subset can be used in crossover and mutation operations of the second genetic-based optimization process.

Further operations can include selecting, from an initial population used in the second genetic-based optimization process, a reduced subset of the initial population based on a magnitude value representative of missed constraints; the reduced subset can be used in crossover and mutation operations of the second genetic-based optimization process.

Applying the second genetic-based optimization to obtain the respective per-device type coefficients that reduce the respective device type power consumption values can include obtaining, for each respective device type of the respective types of devices, a sum of respective per-device coefficients times respective carbon footprint impact scores of respective ones of the devices of the respective device type.

Taking the action to reduce the overall power consumption of the respective types of devices can include applying respective upper limits on power supplied to the respective types of devices based on the respective device type power consumption values.

Figure 6:
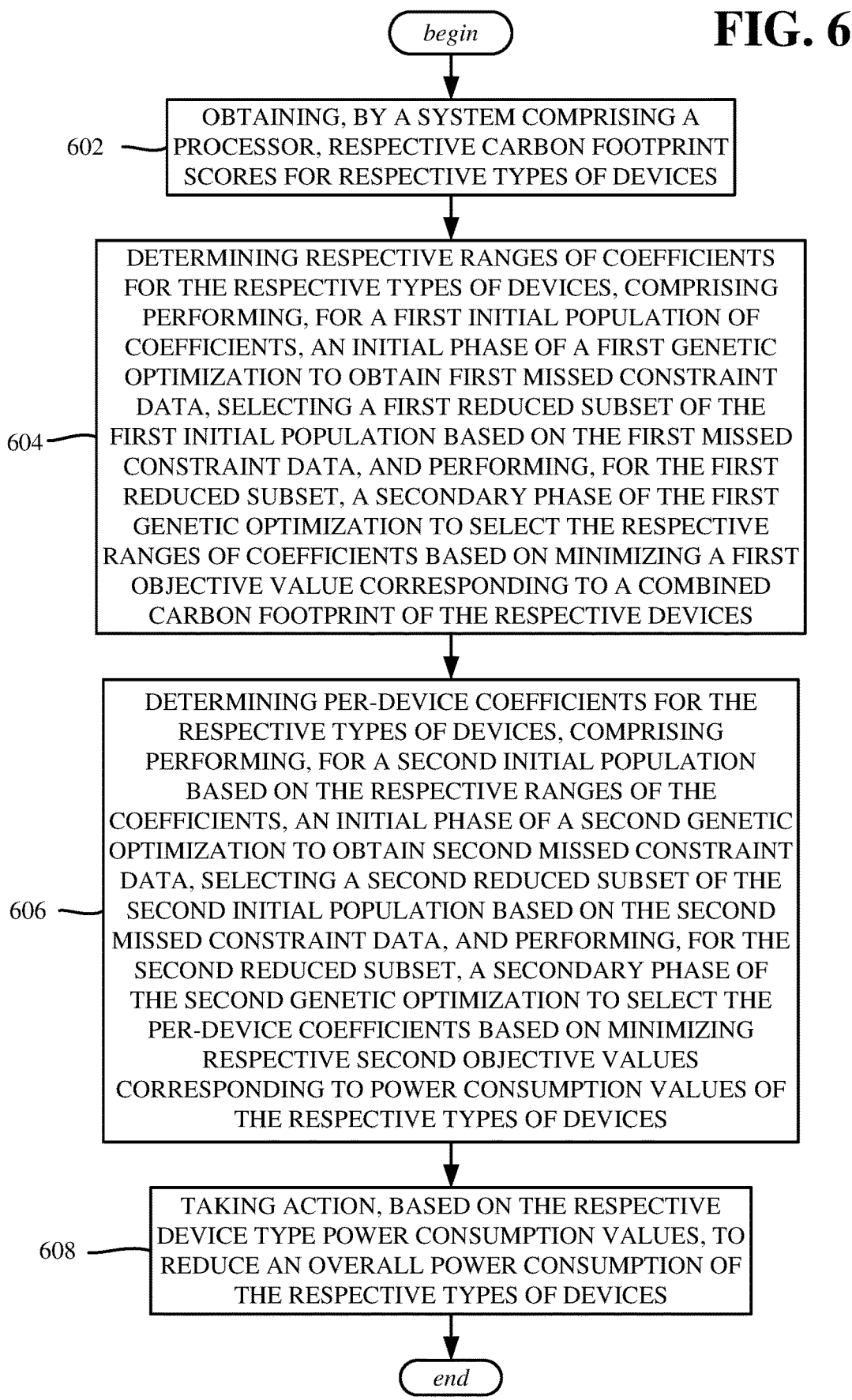
FIG. 6 is a flow diagram showing example operations related to reducing power consumption of devices by determining more optimal coefficients via two-tiered optimization, in accordance with various aspects and implementations of the subject disclosure.

One or more example aspects, such as corresponding to example operations of a method, are represented in FIG. 6. Operation 602 represents obtaining, by a system comprising a processor, respective carbon footprint scores for respective types of devices. Operation 604 represents determining respective ranges of coefficients for the respective types of devices, comprising performing, for a first initial population of coefficients, an initial phase of a first genetic optimization to obtain first missed constraint data, selecting a first reduced subset of the first initial population based on the first missed constraint data, and performing, for the first reduced subset, a secondary phase of the first genetic optimization to select the respective ranges of coefficients based on minimizing a first objective value corresponding to a combined carbon footprint of the respective devices. Operation 606 represents determining per-device coefficients for the respective types of devices, comprising performing, for a second initial population based on the respective ranges of the coefficients, an initial phase of a second genetic optimization to obtain second missed constraint data, selecting a second reduced subset of the second initial population based on the second missed constraint data, and performing, for the second reduced subset, a secondary phase of the second genetic optimization to select the per-device coefficients based on minimizing respective second objective values corresponding to power consumption values of the respective types of devices. Operation 608 represents taking action, based on the respective device type power consumption values, to reduce an overall power consumption of the respective types of devices.

Determining the respective ranges of coefficients for the respective types of devices can include determining respective ranges of coefficients for at least one of: respective server devices, respective switch devices and respective storage devices.

Determining the respective ranges of coefficients for the respective types of devices can include determining respective ranges of coefficients for at least one of: respective server devices, respective fiber channel switch devices, respective internet small computer system interface switch devices, and respective storage devices.

Selecting the first reduced subset of the first initial population based on the first missed constraint data can include evaluating the missed constraint data to select the first reduced subset based on a criterion comprising at least one of: selecting the first reduced subset based on lesser counts of missed constraints or lesser magnitude values of missed constraints.

Selecting the second reduced subset of the second initial population based on the second missed constraint data can include evaluating the missed constraint data to select the second reduced subset based on a criterion comprising at least one of: selecting the second reduced subset based on lesser counts of missed constraints or lesser magnitude values of missed constraints.

Performing, for the second reduced subset, a secondary phase of the second genetic optimization to select per-device coefficients based on the minimizing of the respective second objective values corresponding to the power consumption values of the respective types of devices can include obtaining, for each respective device type, a sum of the respective per-device coefficients times the respective carbon footprint impact scores of the respective devices of the respective device type.

Figure 7:
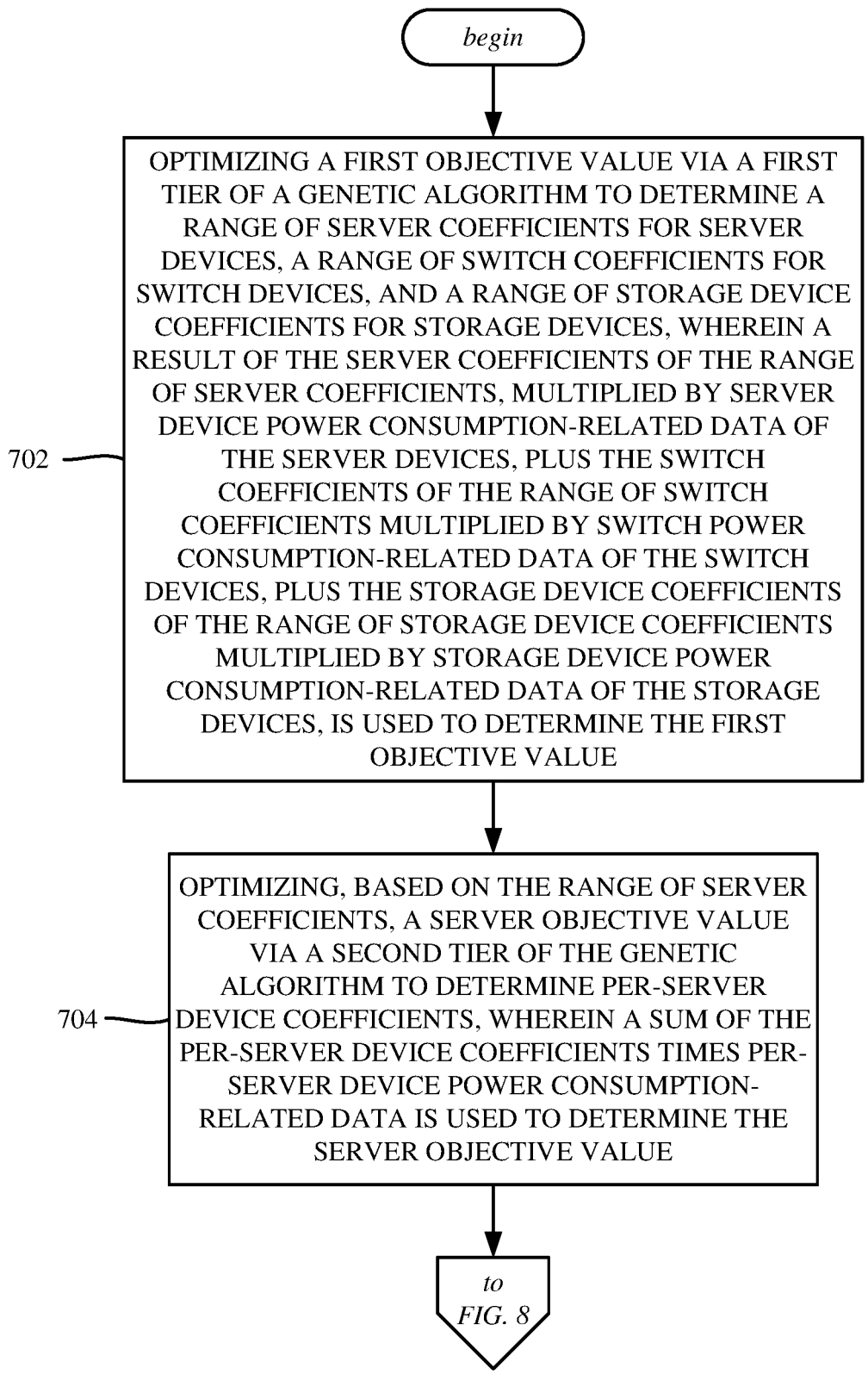
FIGS. 7 and 8 comprise a flow diagram showing example operations related to optimizing servers, switches and storage devices with respect to power consumption, in accordance with various aspects and implementations of the subject disclosure.
Figure 8:
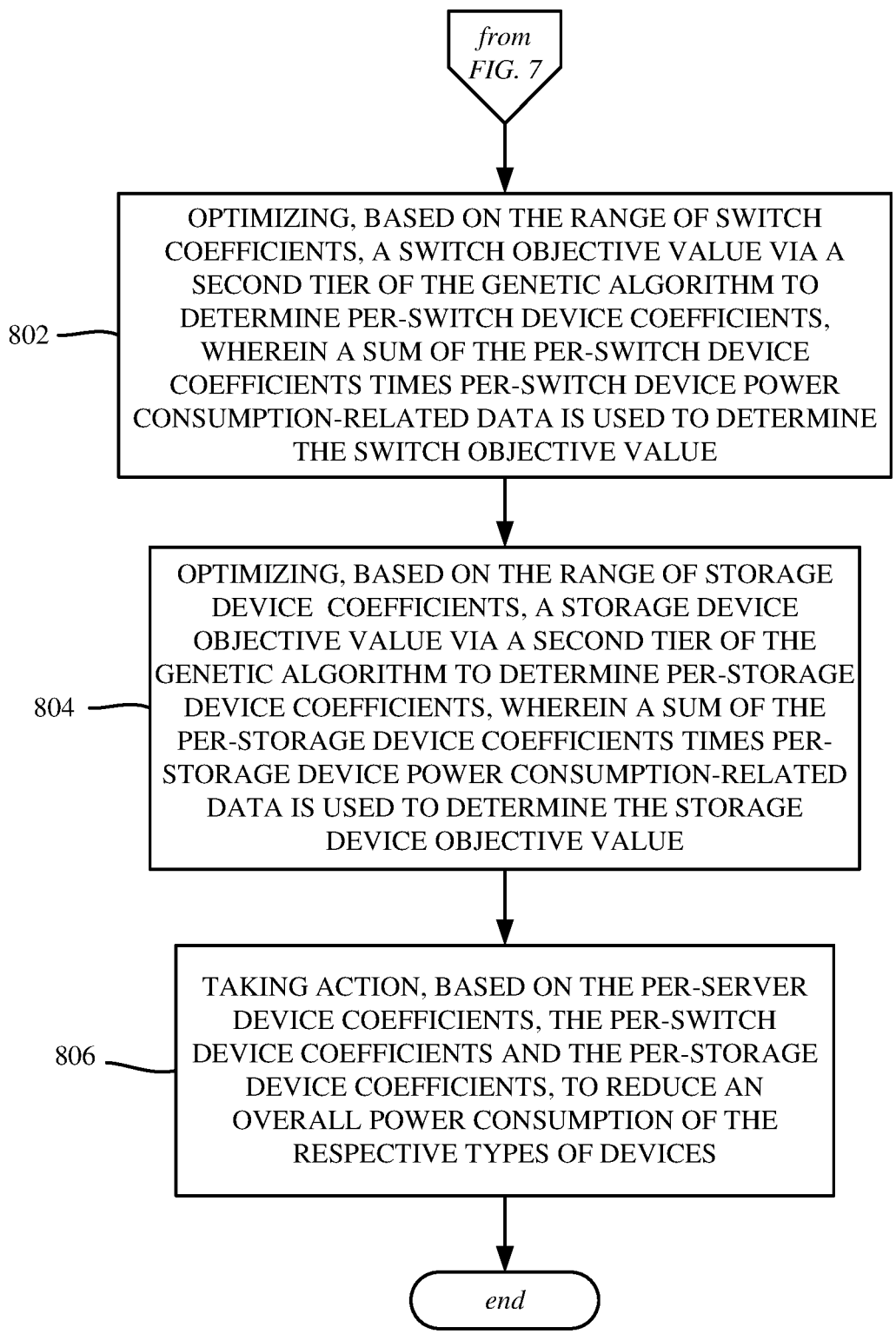

FIGS. 7 and 8 summarizes various example operations, e.g., corresponding to a machine-readable medium, comprising executable instructions that, when executed by a processor, facilitate performance of operations. Operation 702 represents optimizing a first objective value via a first tier of a genetic algorithm to determine a range of server coefficients for server devices, a range of switch coefficients for switch devices, and a range of storage device coefficients for storage devices, wherein a result of the server coefficients of the range of server coefficients, multiplied by server device power consumption-related data of the server devices, plus the switch coefficients of the range of switch coefficients multiplied by switch power consumption-related data of the switch devices, plus the storage device coefficients of the range of storage device coefficients multiplied by storage device power consumption-related data of the storage devices, is used to determine the first objective value. Operation 704 represents optimizing, based on the range of server coefficients, a server objective value via a second tier of the genetic algorithm to determine per-server device coefficients, wherein a sum of the per-server device coefficients times per-server device power consumption-related data is used to determine the server objective value. The operations continue at operation 802 of FIG. 8.

Operation 802 of FIG. 8 represents optimizing, based on the range of switch coefficients, a switch objective value via a second tier of the genetic algorithm to determine per-switch device coefficients, wherein a sum of the per-switch device coefficients times per-switch device power consumption-related data is used to determine the switch objective value. Operation 804 represents optimizing, based on the range of storage device coefficients, a storage device objective value via a second tier of the genetic algorithm to determine per-storage device coefficients, wherein a sum of the per-storage device coefficients times per-storage device power consumption-related data is used to determine the storage device objective value. Operation 806 represents taking action, based on the per-server device coefficients, the per-switch device coefficients and the per-storage device coefficients, to reduce an overall power consumption of the respective types of devices.

Further operations can include selecting, based on an initial population and missed constraint data, a subset of the initial population for processing by the first tier of the genetic algorithm for the optimizing of the first objective value.

Further operations can include selecting, based on an initial population and missed constraint data, a subset of the initial population for processing by the second tier of the genetic algorithm for the optimizing of the server objective value, the switch objective value, and the storage device objective value.

The range of switch coefficients can correspond to a first type of switch, the switch objective value can include first per-switch device coefficients for the first type of switch, the per-switch device power consumption-related data can include first per-switch device power consumption-related data, the switch objective value can be a first switch objective value, and further operations can include optimizing, based on a second range of switch coefficients for a second type of switch, a second switch objective value via the second tier of the genetic algorithm to determine second per-switch device coefficients, and wherein a sum of the second per-switch device coefficients times second per-switch device power consumption-related data is used to determine the second switch objective value.

As can be seen, the technology described herein facilitates individual device power capping based on device types (including servers, switches and storage). Modified two-tier generic optimization with a single objective, which can use constraint data as an intelligent way of doing selections efficiently determines suitable and optimal (or approaching optimal) coefficients that can be used for power capping devices to reduce the carbon footprint in a datacenter or similar environment. The efficient carbon footprint reduction process based on the technology described herein can be repeated as appropriate for an environment, e.g., as workloads change over time, new or replacement devices are installed, and so on. At the same time, optimization-based carbon footprint reduction as described herein can operate to optimize a carbon footprint without impacting existing workloads.

Figure 9:
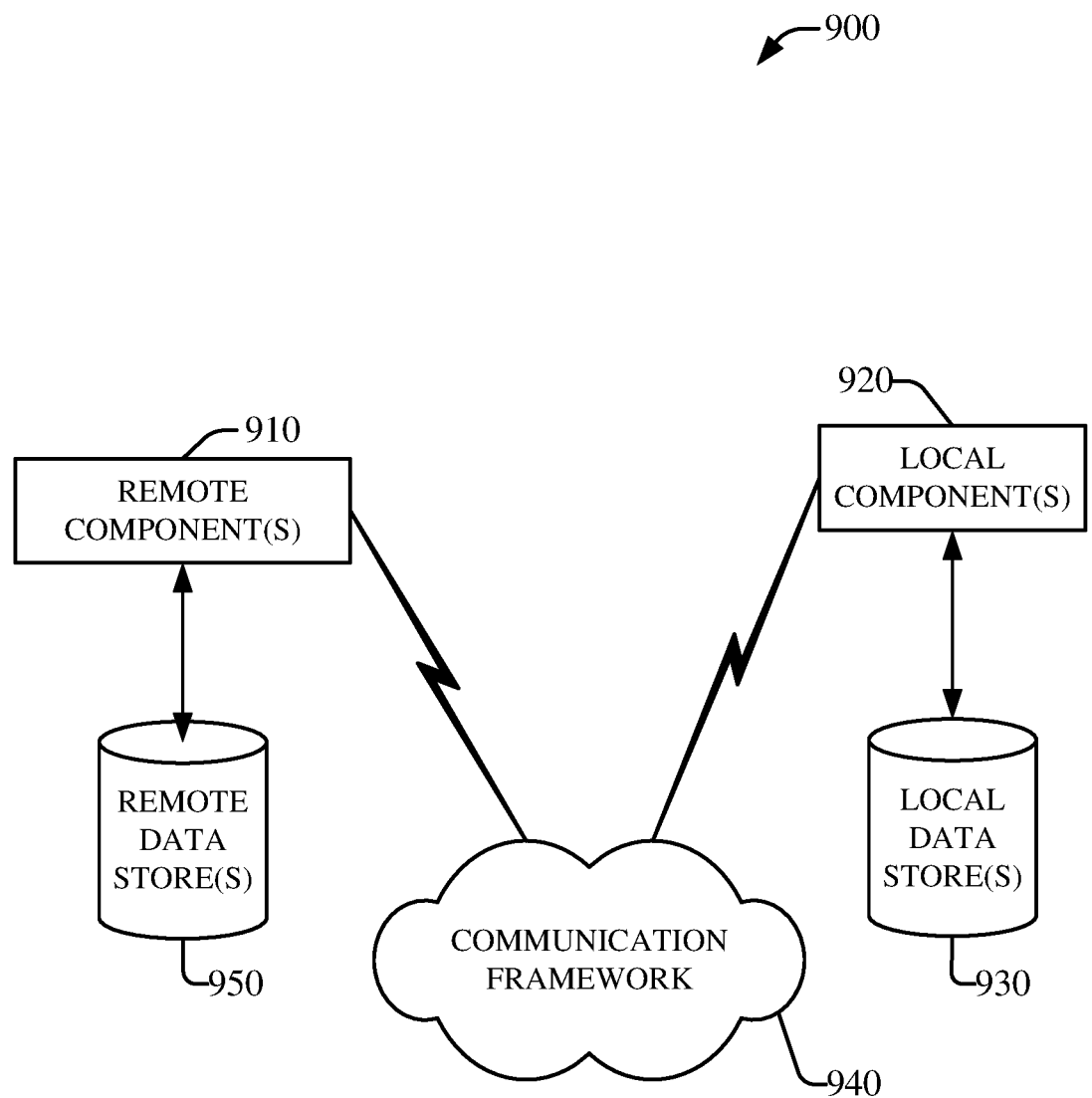
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
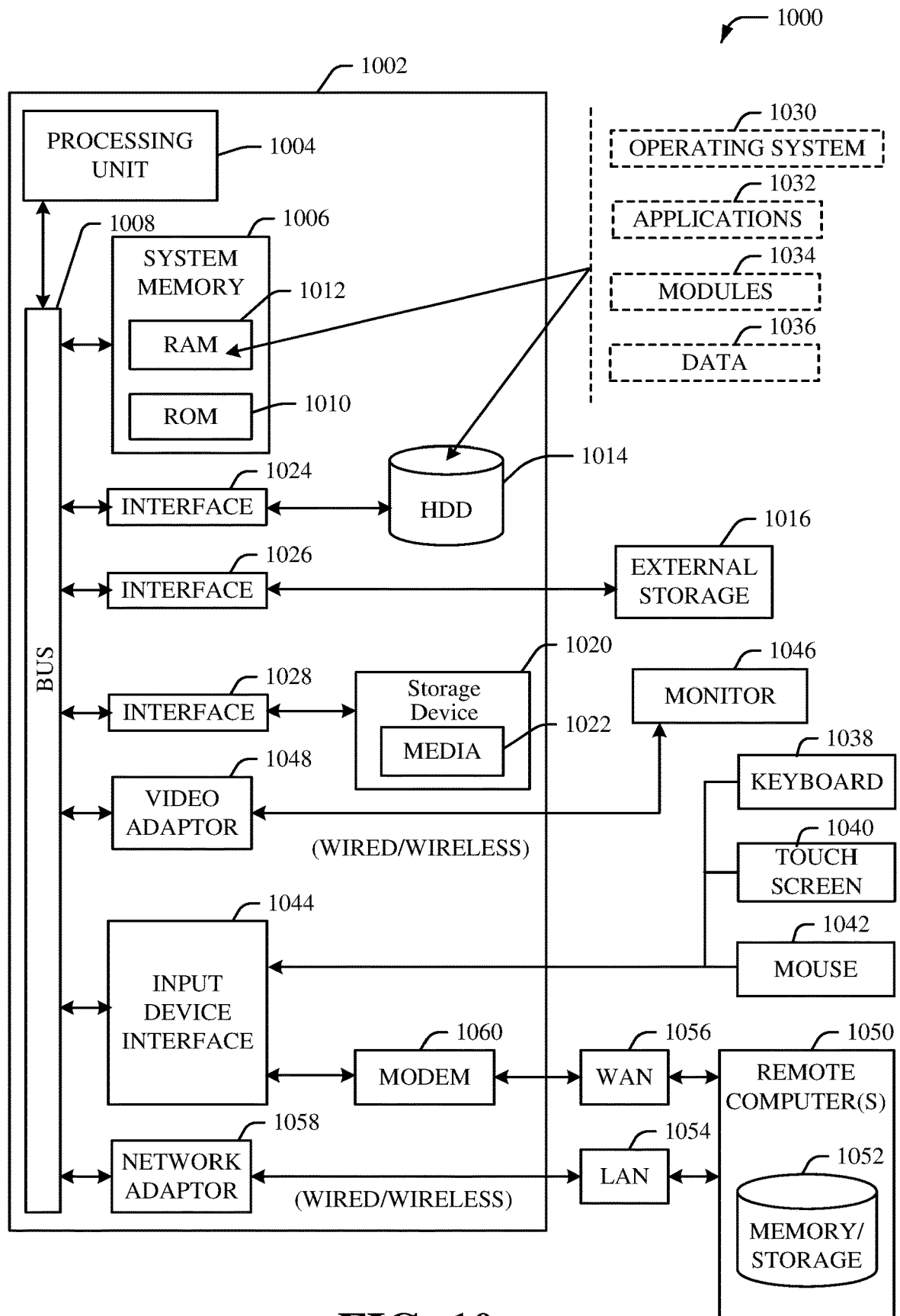
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
determining respective ranges of coefficients that act, according to a defined function, to reduce a combined carbon footprint climate impact score of respective types of devices having respective climate footprint change impact scores, comprising applying a first genetic-based optimization process, to a first initial population of coefficients, to obtain the respective ranges of coefficients, in which the respective ranges of coefficients satisfy respective device type power constraints and respective device type performance constraints;
determining, within the respective ranges of coefficients, respective per-device type coefficients for respective per-device climate impact scores, comprising, for the respective ranges of coefficients, applying a second genetic-based optimization process to obtain the respective per-device type coefficients that reduce respective device type power consumption values, in which the respective per-device type coefficients satisfy the respective device type power constraints and the respective device type performance constraints; and
applying respective upper power wattage limits to limit power supplied to the respective types of devices based on the respective device type power consumption values, to reduce an overall power consumption of the respective types of devices, wherein the applying the respective upper power wattage limits to limit the power supplied to the respective types of devices comprises executing optimization logic that modifies respective power consumption of at least one device of the respective types of devices.

2. The system of claim 1, wherein the respective types of devices comprise respective server devices, respective switch devices and respective storage devices.

3. The system of claim 2, wherein the respective storage devices comprise at least one of: fiber channel switches or internet small computer system interface switches.

4. The system of claim 1, wherein the determining the respective ranges of coefficients that act, according to the defined function, to reduce the combined carbon footprint climate impact score comprises determining the respective ranges of coefficients that act, according to the defined function, to minimize the combined carbon footprint climate impact score.

5. The system of claim 1, wherein the operations further comprise selecting, from the first initial population of coefficients used in the first genetic-based optimization process, a reduced subset of the first initial population of coefficients based on a count of missed constraints, and wherein the reduced subset is used in crossover and mutation operations of the first genetic-based optimization process.

6. The system of claim 1, wherein the operations further comprise selecting, from the first initial population of coefficients used in the first genetic-based optimization process, a reduced subset of the first initial population of coefficients based on a magnitude value representative of missed constraints, and wherein the reduced subset is used in crossover and mutation operations of the first genetic-based optimization.

7. The system of claim 1, wherein the operations further comprise selecting, from a second initial population used in the second genetic-based optimization process, a reduced subset of the second initial population based on a count of missed constraints, and wherein the reduced subset is used in crossover and mutation operations of the second genetic-based optimization process.

8. The system of claim 1, wherein the operations further comprise selecting, from a second initial population used in the second genetic-based optimization process, a reduced subset of the second initial population based on a magnitude value representative of missed constraints, and wherein the reduced subset is used in crossover and mutation operations of the second genetic-based optimization process.

9. The system of claim 1, wherein the applying the second genetic-based optimization process to obtain the respective per-device type coefficients that reduce the respective device type power consumption values comprises obtaining, for each respective device type of the respective types of devices, a sum of respective per-device coefficients times respective carbon footprint impact scores of respective ones of the devices of the respective device type.

10. A method, comprising:
obtaining, by a system comprising a processor, respective carbon footprint scores for respective types of devices;
determining respective ranges of coefficients for the respective types of devices, comprising performing, for a first initial population of coefficients, an initial phase of a first genetic optimization to obtain first missed constraint data, selecting a first reduced subset of the first initial population based on the first missed constraint data, and performing, for the first reduced subset, a secondary phase of the first genetic optimization to select the respective ranges of coefficients based on minimizing a first objective value corresponding to a combined carbon footprint of the respective devices;
determining per-device coefficients for the respective types of devices, comprising performing, for a second initial population based on the respective ranges of coefficients, an initial phase of a second genetic optimization to obtain second missed constraint data, selecting a second reduced subset of the second initial population based on the second missed constraint data, and performing, for the second reduced subset, a secondary phase of the second genetic optimization to select the per-device coefficients based on minimizing respective second objective values corresponding to power consumption values of the respective types of devices; and
applying respective upper power wattage limits to limit power supplied to the respective types of devices based on the respective device type power consumption values, to reduce an overall power consumption of the respective types of devices, wherein the applying the respective upper power wattage limits to limit the power supplied to the respective types of devices comprises executing optimization logic that modifies respective power consumption of at least one device of the respective types of devices.

11. The method of claim 10, wherein the determining the respective ranges of coefficients for the respective types of devices comprises determining the respective ranges of coefficients for at least one of: respective server devices, respective switch devices and respective storage devices.

12. The method of claim 10, wherein the determining the respective ranges of coefficients for the respective types of devices comprises determining the respective ranges of coefficients for at least one of: respective server devices, respective fiber channel switch devices, respective internet small computer system interface switch devices, and respective storage devices.

13. The method of claim 10, wherein the selecting the first reduced subset of the first initial population based on the first missed constraint data comprises evaluating the first missed constraint data to select the first reduced subset based on a criterion comprising at least one of: selecting the first reduced subset based on lesser counts of missed constraints or lesser magnitude values of missed constraints.

14. The method of claim 10, wherein the selecting the second reduced subset of the second initial population based on the second missed constraint data comprises evaluating the second missed constraint data to select the second reduced subset based on a criterion comprising at least one of: selecting the second reduced subset based on lesser counts of missed constraints or lesser magnitude values of missed constraints.

15. The method of claim 10, wherein the performing, for the second reduced subset, a secondary phase of the second genetic optimization to select per-device coefficients based on the minimizing of the respective second objective values corresponding to the power consumption values of the respective types of devices comprises obtaining, for each respective device type, a sum of the respective per-device coefficients times the respective carbon footprint impact scores of the respective devices of the respective device type.

16. A non-transitory machine-readable medium, comprising executable instructions that, when executed by a processor, facilitate performance of operations, the operations comprising:
optimizing a first objective value via a first tier of a genetic algorithm to determine a range of server coefficients for server devices, a range of switch coefficients for switch devices, and a range of storage device coefficients for storage devices;
optimizing, based on the range of server coefficients, a server objective value via a second tier of the genetic algorithm to determine per-server device coefficients;
optimizing, based on the range of switch coefficients, a switch objective value via the second tier of the genetic algorithm to determine per-switch device coefficients;
optimizing, based on the range of storage device coefficients, a storage device objective value via the second tier of the genetic algorithm to determine per-storage device coefficients; and
taking action, based on the per-server device coefficients, the per-switch device coefficients and the per-storage device coefficients, to reduce an overall power consumption of respective types of devices, wherein the taking the action comprises applying respective upper power wattage limits on to limit power supplied to the respective types of devices based on respective device type power consumption values, wherein the applying the respective upper power wattage limits to limit the power supplied to the respective types of devices comprises executing optimization logic that modifies respective power consumption of at least one device of the respective types of devices.

17. The non-transitory machine-readable medium of claim 16, wherein the operations further comprise selecting, based on an initial population and missed constraint data, a subset of the initial population for processing by the first tier of the genetic algorithm for the optimizing of the first objective value, and wherein a result of server coefficients of the range of server coefficients, multiplied by server device power consumption-related data of the server devices, plus switch coefficients of the range of switch coefficients multiplied by switch power consumption-related data of the switch devices, plus storage device coefficients of the range of storage device coefficients multiplied by storage device power consumption-related data of the storage devices, is used to determine the first objective value.

18. The non-transitory machine-readable medium of claim 16, wherein the operations further comprise selecting, based on an initial population and missed constraint data, a subset of the initial population for processing by the second tier of the genetic algorithm for the optimizing of the server objective value, the switch objective value, and the storage device objective value, wherein a sum of the per-server device coefficients times per-server device power consumption-related data is used to determine the server objective value, wherein a sum of the per-switch device coefficients times per-switch device power consumption-related data is used to determine the switch objective value, and wherein a sum of the per-storage device coefficients times per-storage device power consumption-related data is used to determine the storage device objective value.

19. The non-transitory machine-readable medium of claim 16, wherein the range of switch coefficients corresponds to a first type of switch, wherein the switch objective value comprises first per-switch device coefficients for the first type of switch, wherein per-switch device power consumption-related data comprises first per-switch device power consumption-related data, wherein the switch objective value is a first switch objective value, wherein the operations further comprise optimizing, based on a second range of switch coefficients for a second type of switch, a second switch objective value via the second tier of the genetic algorithm to determine second per-switch device coefficients, and wherein a sum of the second per-switch device coefficients times second per-switch device power consumption-related data is used to determine the second switch objective value.

20. The system of claim 1, wherein the operations further comprise obtaining respective carbon footprint scores for the respective types of devices.

* * * * *